April 23, 1935.  F. HEDLEY ET AL  1,998,718
TRANSPORTATION VEHICLE
Filed May 6, 1932   6 Sheets-Sheet 1
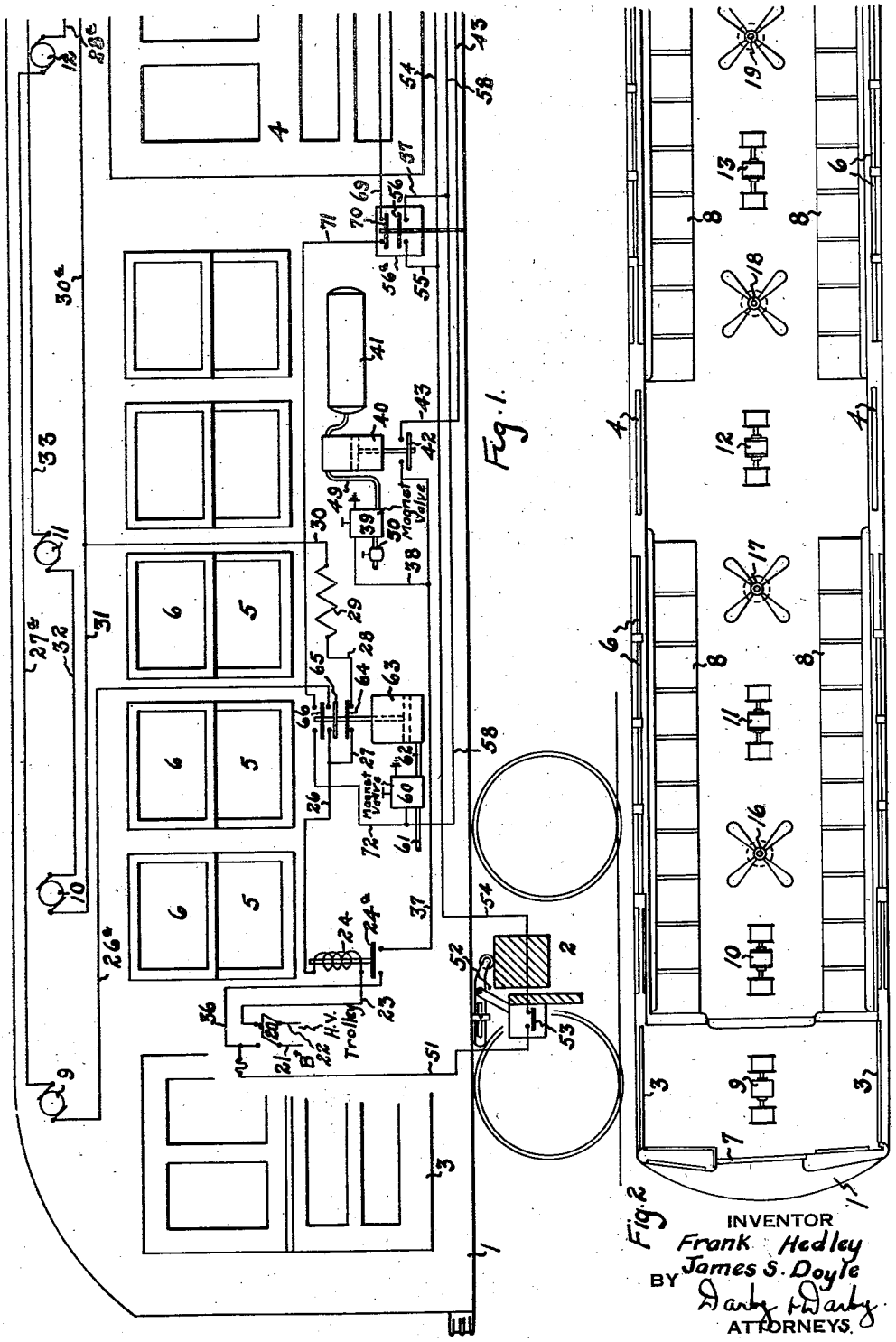
INVENTOR
Frank Hedley
James S. Doyle
BY
ATTORNEYS.

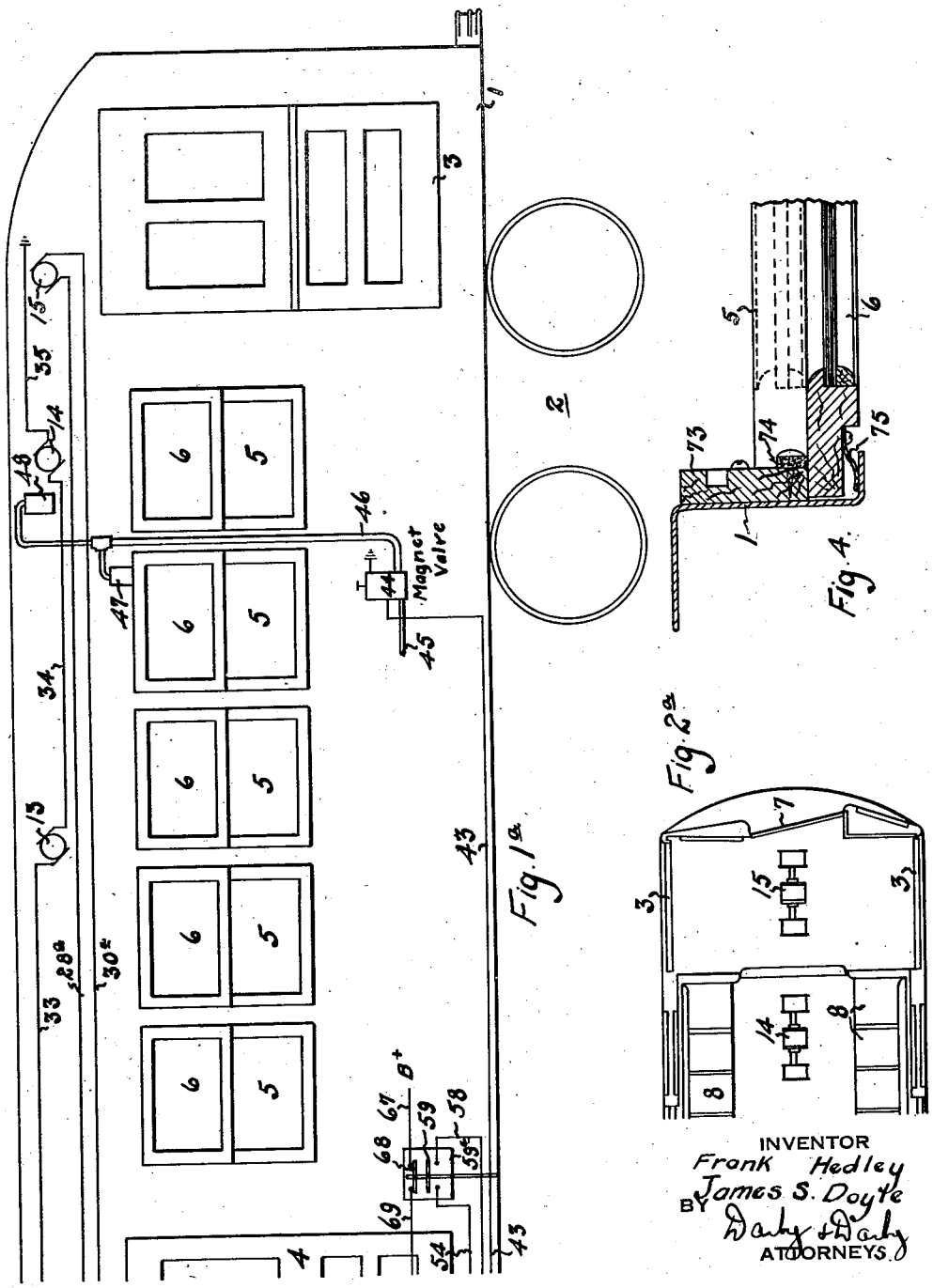

April 23, 1935.　　　F. HEDLEY ET AL　　　1,998,718
TRANSPORTATION VEHICLE
Filed May 6, 1932　　　6 Sheets-Sheet 3
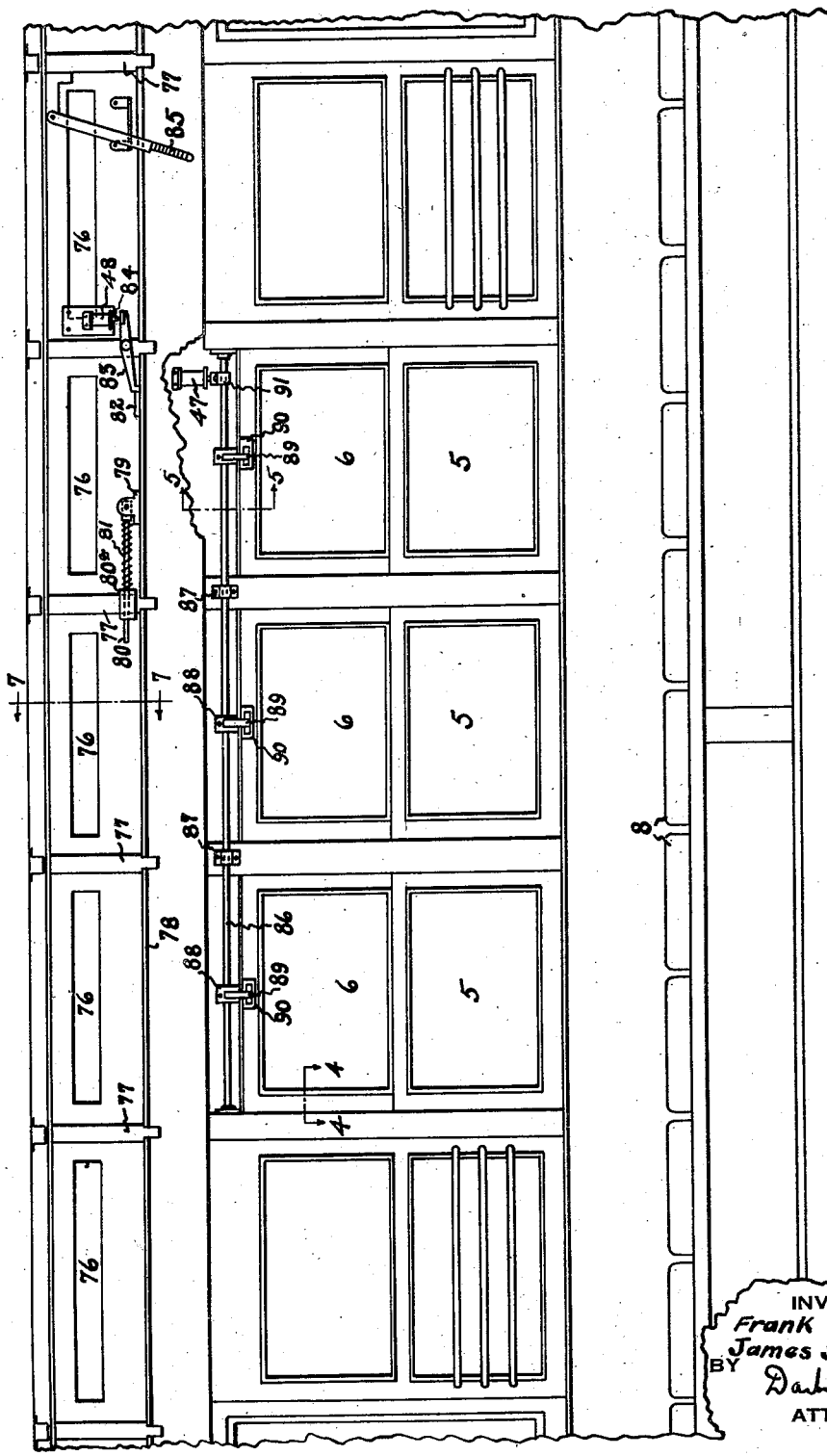

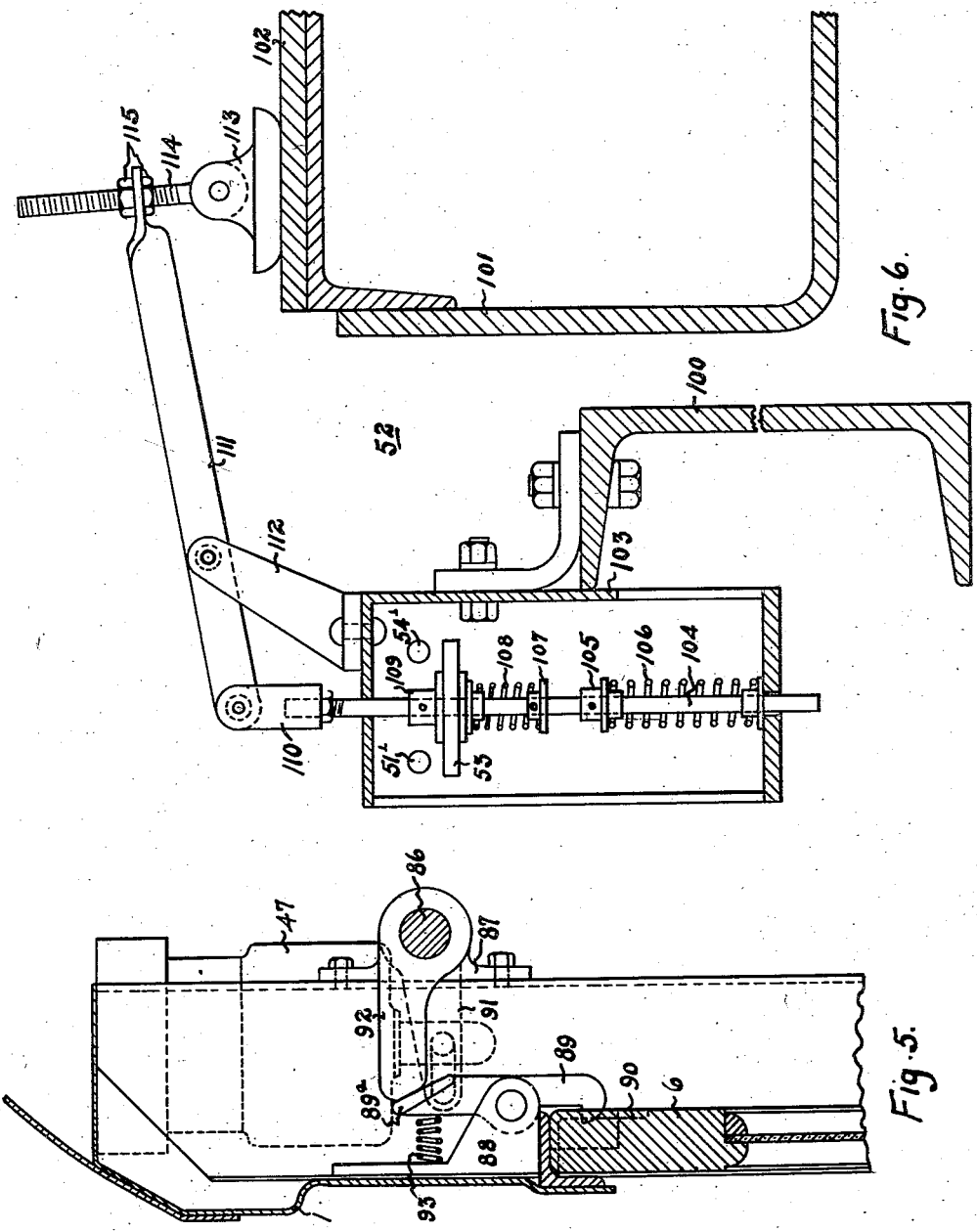

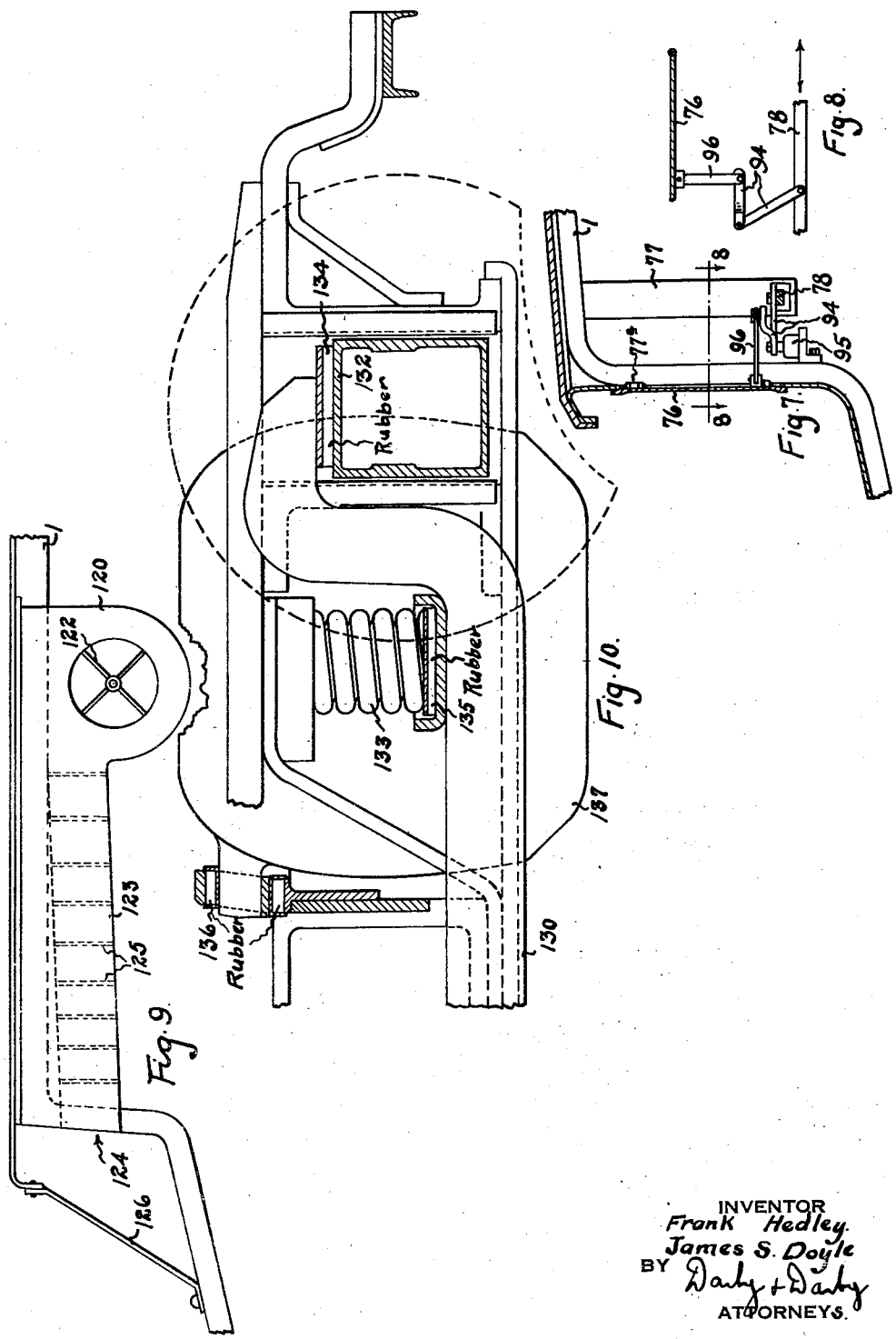

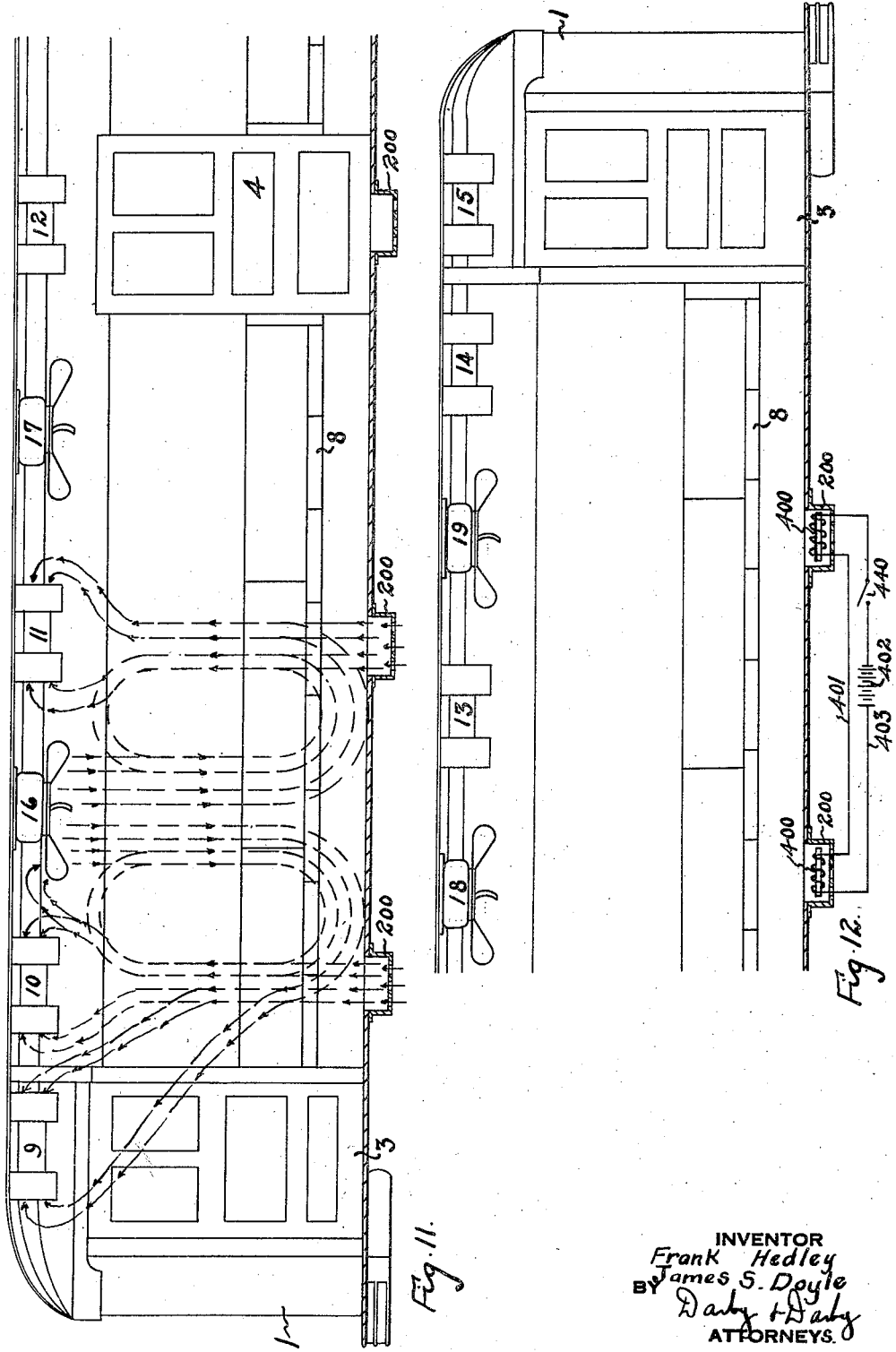

Patented Apr. 23, 1935

1,998,718

UNITED STATES PATENT OFFICE 1,998,718

TRANSPORTATION VEHICLE

Frank Hedley, Yonkers, and James S. Doyle, Mount Vernon, N. Y.; The Chase National Bank of the City of New York executor of said James S. Doyle, deceased Application May 6, 1932, Serial No. 609,620

15 Claims. (Cl. 98—4)

This invention relates in general to improvements in transportation vehicles.

One of the objects of the invention is to provide a transportation vehicle, such as a subway car, with more comfortable conditions within the interior thereof.

Another object of the invention is to provide a subway car within which the noise level therein is relatively low and the air within the interior thereof is relatively free from dust and dirt and which, at the same time, provides more comfortable and more sanitary traveling conditions for its occupants.

A further object of this invention is to provide a closed transportation vehicle with ventilating means for expelling the air from the car and permitting fresh air to enter under atmospheric pressure through the multitude of small openings and crevices which are normally present in modern car construction with a consequent prevention of the entrance of dust and dirt into the interior of the vehicle, or equipped with special openings with electro-magnetic or permanent magnet for the purpose of collecting steel dust, thus purifying the air of the car.

Another object of this invention is to provide evaporation fans within the car and associated with the air expelling fans so that extremely comfortable conditions are maintained within the car.

A still further object of this invention is to provide a ventilating apparatus and control mechanism therefor so that as the passenger load increases the volume of fresh air introduced into the car per unit of time increases to maintain sanitary condition or regulation of $CO_2$ air content within the car when fully loaded.

A further object of this invention is to provide automatically operating apparatus for opening the windows and ventilators of the vehicle under emergency conditions when the ventilating apparatus becomes inoperative through loss of power or for any reason.

A still further object of this invention is to provide an improved form of truck construction employing rubber blocks between parts of the truck to eliminate and absorb the noises normally generated by and transmitted through the present forms of car trucks when the car is in motion.

These and many other objects, as will appear from the following disclosure, are secured by means of this invention.

This invention resides substantially in the combination, construction, arrangement and relative location of parts, all as will be described in the following specification in connection with the attached drawings and set forth in the appended claims.

Referring to the drawings—

Figures 1 and 1a, taken together, show diagrammatically in elevation a car embodying the features of this invention;

Figs. 2 and 2a represent a diagrammatic plan view of the car showing the relative arrangement of the ventilating fans and the evaporation fans;

Fig. 3 is an enlarged inside elevational view of a portion of one side of the car showing the windows and roof ventilators and the mechanism for operating them;

Fig. 4 is a cross-sectional view taken on the line 4—4 of Fig. 3;

Fig. 5 is a cross-sectional view taken on the line 5—5 of Fig. 3;

Fig. 6 is a cross-sectional view through the variable load device for controlling the ventilating fans;

Fig. 7 is a cross-sectional view of a roof ventilator taken on the line 7—7 of Fig. 3;

Fig. 8 is a cross-sectional view taken on the line 8—8 of Fig. 7;

Fig. 9 is a side elevational view of one of the ventilating fans;

Fig. 10 is an enlarged side elevational view with some parts shown diagrammatically and some parts in cross-section of a half of one of the car trucks; and Figs. 11 and 12, taken together, diagrammatically represent the interior of a car to which this invention has been applied showing the circulation of air currents and showing, in addition, special air inlet ducts.

The principles of this invention may be applied to all forms of transportation vehicles, such as surface cars and subway cars, whether steam or electric, buses and automobiles, air vehicles, or the like.

The invention may likewise be applied to all forms of building from the interior of which it is desired to exclude noises, and within the interior of which it is desirable to effect at the same time comfortable and healthy air conditions.

However, the advantages of this invention are of their greatest practical value when applied to subway cars and the like, which operate through more or less closed tunnels and are hence subjected to higher noise levels and greater impure air conditions. The invention also has great practical value when applied to air vehicles in view of the noise generated by their engines.

As is well known, the operation of subway trains in underground tunnels is a source of considerable noise, dust and dirt. Because of the fact that the tunnels are substantially closed the noises generated by the movements of the trains therethrough are intensified in effect on the ear by reason of the multiple reflection and reverberation.

The general object of this invention is to provide subway cars of such a construction that substantially all of the noises generated exteriorly of the car are excluded from the interior thereof resulting in a reduction of the normal noise level within the car. This object is effected by normally maintaining all the doors and windows closed so that the car is substantially sealed, especially against the entrance of sounds. By thus substantially sealing up the car it is necessary to provide some means for supplying fresh air to the interior of the car in sufficient quantities to maintain healthful and comfortable conditions therein.

It is another object of this invention, therefore, to provide apparatus for supplying fresh air into the interior of the car. With this invention this is accomplished to the exclusion of dust and dirt which is prevalent in subway tunnels and which is stirred up by the rapid movement of the trains therethrough. Subway trains are a source of atomized oil and steel dust which are produced in the normal operation of them and which permeate the air of the tunnels. By means of this invention fresh air is introduced into the substantially closed car by atmospheric pressure through the many cracks and crevices around the doors and windows, or special openings when necessary, of the car by blowing the air from the interior of the car with ventilating blowers. Introduction of the air through the small cracks and crevices causes a filtering action which removes the dust, dirt, atomized oil and steel dust from the air as it passes into the car.

It is likewise apparent that special air inlets or ducts may be provided through which air may enter the car to supplment the air supplied through the cracks and crevices normally present in such vehicles. Particularly in the case of air vehicles, the fuselage or body may be sealed so as to be substantially airtight and be provided with special air inlet openings. In all cases, and particularly in the case of land vehicles, these special air inlet openings are preferably covered with suitable air transmitting screens and provided with magnetic steel dust collectors constructed to exclude as much as possible all the dust, dirt, and other foreign particles in the air, as well as to reduce to a minimum the sounds entering the vehicle therethrough.

Another feature of this invention involves the use of cooling or evaporation fans which are disposed in relation to the ventilating blowers so that the fresh air, when introduced into the car, is circulated over the passengers to maintain them comfortable without interfering with the formation of air circuits for the air that is to be discharged from within the vehicle.

Another feature of this invention involves automatic apparatus for controlling the ventilating blowers so that as the load increases the quantity of fresh air introduced into the car increases proportionately.

A still further feature of the invention involves automatically operating apparatus for opening the windows, doors and roof ventilators of the car when the ventilating blowers stop for any reason, such as the failure of the power supply thereto to permit free circulation of air through the car.

Although the blowers are shown as driven by electric motors it is apparent that the features of this invention may be applied to a system employing any known type of power source, the main object being to open the doors, windows and ventilators to permit free circulation of air when, for any reason, a forced circulation is prevented.

Reference will now be made to the drawings in which is disclosed one physical form of apparatus for accomplishing the above objects. In Figures 1 and 1ª and 2 and 2ª there is shown diagrammatically a subway car employing the principles of this invention. The car body is indicated diagrammatically at 1 having the end doors 3 and the center doors 4 at each side. The car trucks for supporting the body are indicated diagrammatically at 2. The windows are shown comprising the bottom portions 5 and the upper portions 6. The car is provided with end doors 7 and a suitable seating arrangement as indicated at 8. In normal operation of the car all the doors and windows are closed. No special precautions are taken to entirely seal the car so that there are a multitude of cracks and crevices around the doors and windows through which air may enter the car at a multitude of points. Disposed along the roof of the car on the interior thereof are a number of motor driven exhaust blowers, as indicated diagrammatically at 9, 10, 11, 12, 13, 14 and 15. Five of these motor driven blowers are within the main body of the car and two of them, namely, the motor driven blowers 9 and 15 are supported on the roof of the end vestibules. Supported from the underside of the roof of the car between the motor driven blowers are the cooling or evaporation fans 16, 17, 18 and 19. These evaporation fans are motor driven and act to drive the air downwardly towards the bottom of the car.

At 21 is a wire leading from a suitable current source, such as the car battery, and at 22 is the high voltage trolley wire which extends to the third rail trolley shoe. These wires are connected through a suitable switch 20 so that wire 22 may be connected with wire 23 and wire 21 may be connected with wire 36. Switch 20 should be of a type such that as the trolley circuit is broken the battery circuit will be simultaneously broken, otherwise the windows and roof ventilators would open every time the trolley circuit was broken which would be undesirable. Wire 23 is connected in series with the relay solenoid 24 which, in turn, is connected through a wire 26 to the middle lefthand contact of the blower circuit controller. Wire 26 is connected by wire 27 to the lower lefthand contact of this controller. A corresponding contact, i. e. the lower righthand contact, is connected by wire 28 through resistance 29, wire 30, wire 31, blower of exhaust fan motor 10, wire 32, motor 11, wire 33, motor 13, wire 34, motor 14, and wire 35 to ground. Thus motors 10, 11, 13 and 14 are connected in series across the third rail so that in the normal operation of the car with light loads four of the exhaust blowers are operating to force the air from the car. At this time the contact plate 64 interconnects wires 27 and 28.

The middle righthand contact of the blower circuit controller is conected by wire 26ª to motor 9 which is connected by wire 27ª to motor 12 which, in turn, is connected by wire 28ª to motor 15, which, in turn, is connected by wire 30ª to wire 31. Thus when contact plate 65 interconnects wires 26 and 26ª current flows from the third rail through wire 22, switch 20, wire 23, relay solenoid 24, wire 26, contact plate 65, wire 26ª, motor 9, wire 27ª, motor 12, wire 28ª, motor 15, wire 30ª, wire 31, motor 10, wire 32, motor 11, wire 33, motor 13, wire 34, motor 14, and wire 35 to ground.

Thus when the car is fully loaded, as during the rush hours, the blower circuit controller is operated so that interconnection of wires 27 and 28 is broken by removal of contact plate 64 and contact plate 65 interconnects wires 26 and 26ª and then all of the exhaust blower motors are connected in series across the third rail so that additional quantities of fresh air are supplied by increasing the rate at which the air in the car is expelled therefrom.

The blower circuit controller is operated by the variable load device which is indicated generally at 52. This device is associated with truck parts so that its operation is effected by the relative motion of these parts as the car load varies. This causes contact plate 53 to interconnect wires 51 and 54 at a predetermined load. Wire 51 is connected to wire 36 which is connected through switch 20 to wire 21 which, in turn, is connected to the positive side of a suitable current source such as the storage battery. Wire 54 is connected to the lower left hand contact of each of the door lock interlock switches 56ª and 59ª. Thus wire 54 is connected to the lower left hand contact of interlock 59ª and by wire 55 to the lower left hand contact of interlock 56ª. The lower right hand contact of interlock 59ª is connected by wire 58 to one terminal of the solenoid winding in the electromagnet valve 60, the other terminal of which is grounded. Wire 58 is also connected by wire 57 to the lower right hand contact of interlock 56ª. The lower contacts of interlock 56ª are controlled by contact plate 56 and the lower contacts of interlock 59ª are controlled by contact plate 59. These interlocks are provided with an upper set of contacts which are controlled by the contact plates 70 and 68 of the interlocks 56ª and 59ª, respectively. The upper right hand contact of interlock 59ª is connected by wire 67 to the storage battery and the upper left hand contact is connected by wire 69 to the upper right hand contact of interlock 56ª. The corresponding contact is connected by wire 71 to the uppermost right hand contact of the blower circuit controller and the corresponding contact thereof is connected by wire 72 to the ungrounded terminal of the winding of the magnet valve 60. Contact plate 66 controls the upper set of contacts of the blower circuit controller. The interlocks 56ª and 59ª are connected with the door operating mechanism, one on each side of the car, in a manner now well known in this art so that they are in the position shown when the doors are closed and locked and when the doors are unlocked and open they move to a position to move the upper contact plate and to interconnect the lower set of contacts. With the car loaded to exceed a predetermined amount the variable load device is operated so that contact plate 53 interconnects wires 51 and 54.

With the doors on either side of the car unlocked and open current then flows through wire 21, switch 20, wire 51, contact 53, wire 54, and the lower set of contacts of either interlock 56ª or 59ª depending upon which side of the car doors are open. In other words, the interlock 56ª is provided for the doors on one side of the car and interlock 59ª is provided for the doors on the other side of the car. As is apparent, the lower contacts of these interlocks are in parallel across the wires 54 and 58 so that on whichever side the doors are open wires 54 and 58 will be interconnected. Current then flows through wire 58 and magnet valve 60 to ground. As a result air is supplied from pipe 61 through the valve 60 and pipe 62 to the cylinder 63 of the blower circuit controller causing the piston therein to move the contact plates 64, 65 and 66 upwardly. As a result the circuit for the four blowers is broken and the circuit for the seven blowers in series is closed by the interconnection of wires 26 and 26ª. At the same time wires 72 and 71 are interconnected by contact plate 66. As the doors which are open close the upper set of contacts of the corresponding interlock are interconnected before the lower set are disconnected and a holding circuit for magnet 60 is completed. Current flows through wire 67, contact plate 68, wire 69, contact plate 70, wire 71, contact plate 66, wire 72, and magnet valve 60 to ground.

Thus it is evident that the position of the piston and contact plates of the blower circuit controller is established by the variable load device only when the car doors are unlocked and open, which normally occurs only when the car is stopped, and that whatever position is established at that time is maintained after the doors are closed and locked regardless of any change of setting of the variable load device due to oscillation of the truck parts when the car is in motion. It will be noted that when only four of the exhaust blower motors are in circuit resistance 29 is in series with them but when the seven blower motors are in circuit resistance 29 is cut out of circuit.

Wire 36 is also shown connected to one contact of the relay switch 24. The other contact of this switch is connected by wire 37 to one of the contacts of the time limit relay 40. Wire 38 connects wire 37 to one terminal of the solenoid winding of the electromagnet valve 39, the other terminal of which is grounded. The other terminal of the time limit relay 40 is connected by wire 43 to one terminal of the solenoid winding in magnet valve 44 which has its other terminal grounded. Pipe 45 connects to the fluid pressure source. Pipe 46 connects valve 44 with the window releasing fluid pressure motor 47 and the roof ventilator releasing motor 48.

Should the third rail power supply fail for any reason so that the solenoid winding 24 is deenergized contact plate 24ª will drop down and interconnect wires 36 and 37. As a result current flows through wire 21, switch 20, wire 36, contact plate 24ª, wire 37, wire 38, and the winding of magnet valve 39 to ground. The supply of fluid pressure to the time limit relay 40 and 41 is cut off and the fluid pressure in 40 and 41 is exhausted to atmosphere through speed valve 50 and the piston thereof begins to move upwardly carrying contact plate 42 with it. This relay has a delayed action so that it takes a given period of time, predetermined by setting of speed valve 50, such as two or three minutes, for example, before it moves to interconnect wires 37 and 43. This time limit relay is employed so that in case the power failure is only for a short period of time the circuit which it controls will not be completed. It is also quite necessary because of the gaps normally employed in the third rail. In passing these gaps the power supply is momentarily cut off and it is not desirable to complete the circuit including wires 37 and 43 under these transient conditions but only when the power failure is of a long enough duration so that it becomes necessary to supply fresh air to the interior of the car. When wires 37 and 43 are interconnected magnet valve 44 is energized and fluid pressure is supplied through pipes 45 and 46 to the motors 47 and 48 which operate to release the windows and roof ventilators so that they open.

The apparatus for permitting the windows to open will now be described. The upper half 6 of each window in Figs. 3 and 5 is held closed against the action of gravity by latches 89. A shaft 86 journaled in the brackets 87 extends along each side of the car for each half above the windows, as shown. This shaft is connected by an arm 91 to the plunger of the fluid pressure motor 47. Under normal conditions with the windows locked closed fluid pressure is not supplied to the motor 47 so that the parts are in the position shown in Fig. 5. Mounted on the car above each window is a bracket 88 in which is pivotally mounted a latch 89. This latch is provided at its upper end with an inclined wing 89ª which is engaged by a short lever 92 secured to the shaft 86. A plate 90 is secured to the top of the window and is engaged by the latch 89. A spring 93 normally holds the latch 89 in locking position. When fluid pressure is supplied to motor 47 its plunger moves downwardly causing counter-clockwise rotation of shaft 86 and arm 92 (Fig. 5) by reason of its connection with the shaft by arm 91. This causes the lower end of latch 89 to move to the right releasing the upper half 6 of each of the windows which permits them to fall to open position.

The roof ventilators likewise open when the motor 48 is supplied with fluid pressure. The top of the car along each side is provided with ventilating openings which are closed by means of ventilating doors 76 mounted on hinges 77ª (see Fig. 7).

Depending from the top of the car at spaced points along each side are the brackets 77 in which is mounted a longitudinally slidable rod or bar 78. Secured to this bar 78 is a bracket 79 to which is pivotally connected a rod 80 which is slidably mounted in a bearing 80ª. A spring 81 is mounted between the member 80ª and the bracket 79 and is compressed when the ventilator doors 76 are closed. Secured to the bar 78 is a stop 82 which is engaged by a pivotally mounted lever 83 when the ventilators are closed. When fluid pressure is supplied to motor 48 its plunger 84 moves downwardly so as to disengage lever 83 from the stop 82. This frees the bar 78 and it moves to the right as spring 81 expands. This movement of the bar is transmitted to each of the ventilator doors 76 through a bell crank lever 94 (Fig. 7) which is pivotally connected to the bar 78 and pivotally connected by link 96 to the ventilator door 76. The bell crank is pivotally mounted on a support 95. Thus, as the bar 78 slides to the right under the action of spring 81, the ventilator doors are open. A pivotally mounted hand lever 85 is provided to move the rod 78 back to normal position to close the ventilators, compress spring 81, and position stop 82 against the end of lever 83.

The manner of mounting the windows on the car frame and their relative position is shown in Fig. 4. The lower half 5 of the window is normally closed and the upper half is free to move up and down. A guide for the upper half is shown at 73 mounted on the car frame 1. The upper half 6 of the window is provided with a weatherstrip 75 on one side to aid in keeping out the noise, dust and dirt wtihout seriously interfering with the leakage of air into the car at this point. A felt strip 74 is mounted on the guide adjacent the window to act in a similar capacity.

From the above it will be apparent how the windows and roof ventilators open automatically upon the failure of the power supply to the ventilating fan motors for a period greater than it takes the time limit relay 40 to act.

The variable load device is shown in detail in Fig. 6. At 100 is the transom beam of one of the trucks to which is secured a casing 103 in which is the switch which controls the blower circuit controller. At 101 is the truck bolster on which is mounted a plate 102. The members 101 and 102 move up and down with respect to the fixed beam 100 as the load in the car varies and the truck springs are loaded. Mounted in the casing 103 is a vertical slidable rod 104. Secured to the rod are the collars 105, 107 and 109. A spring 106 is mounted between the bottom of the casing and collar 105 so as to normally urge the rod 104 upwardly. At 53 is the contact plate which is slidably mounted on the rod 104.

A spring 108 lies between the collar 107 and the contact plate 53 and normally urges it into engagement with the collar 109. Mounted above the contact plate are the contacts 51' and 54' which are connected to the wires 51 and 54 respectively. Secured to the upper end of the rod is a member 110 in which is pivotally mounted a lever 111. This lever is also pivotally secured to a bracket 112. At 113 is a shoe which rests on the plate 102 and has pivotally secured to it a threaded rod 114. The free end of lever 111 is adjustably secured to this rod by means of the lock nut 115. As the car loads and members 101 and 102 descend the right hand end of lever 111 descends with it. This permits rod 104 to move upwardly under the action of spring 106. Upon sufficient movement contact plate 53 interconnects the contacts 51' and 54'.

A detail of the exhaust blowers for discharging air from the car is shown in Fig. 9. Each of the structures is the same as that shown in Fig. 9. It comprises a housing or casing 120 within which the motor and suction fans are mounted. The casing may be provided with an opening on each side and a suction fan 122 in each opening with a motor between them for rotating them. The air drawn into the casing is discharged through the combination 123 of the casing which forms a duct opening through the top of the car into the atmosphere as indicated at 124. These openings should preferably be covered with a screen to keep out dust and dirt and aid in keeping out sounds.

The duct is provided with a series of transverse baffle plates 125 arranged so as to provide a tortuous path for the escaping of air and to act to prevent the entrance of sounds into the car through those ducts. Adjacent the discharge opening 124 is mounted an inclined baffle plate 126 to further shield the opening. When the exhaust blowers are operating the air in the car is drawn into the casings 120 and discharged through the ducts 123 into the atmosphere. This creates a partial vacuum in the car and as a result fresh air leaks into the car at a multitude of distributed points throughout the car body wherever there is a crack or crevice. The air entering such small openings is subjected to a filtering action so that a minimum amount of dust and foreign material, such as atomized oil, dirt from the road bed, and steel dust gets into the car. In addition a minimum amount of sound gets into the car. Another advantage of this system obviously resides in the fact that the fresh outside air does not enter the car at one concentrated point in a large volume but is delivered into the car at many distributed points throughout the car body in relatively small streams.

Another important advantage of this invention results from the fact that it has been found from actual experience that the air conditions within a car employing the features of this invention are much better than in a car which is ventilated by free circulation of air through the agency of open windows and the like.

In the first place, as already pointed out, a minimum amount of suspended matter gets into the interior of the car. By continually exhausting the foul air from the top of the car and introducing fresh air at a multitude of points the carbon dioxide content of the car is much lower than in the case with an ordinary car with its windows and ventilators open. In addition, this fresh air being circulated by the evaporation fans over the passengers creates a far more comfortable condition than is ordinarily attainable in subway cars. The general result is a quiet, comfortable, sanitary car supplied with adequate quantities of fresh air and a maintenance of the carbon dioxide content of the air below conditions now normally considered satisfactory. The reduction of noise within the car is further obtained by employing rubber inserts between those parts of the car truck to prevent transmission of sounds into the car body. As illustrated in Fig. 10, the truck frame 130 is mounted on the journal boxes 132 and has a block of rubber 134 interposed between them. The springs 133 are likewise mounted on a rubber pad 135 and the supporting brackets of the driving motor 137 are likewise mounted in rubber cushions 136. Rubber pads should also be used between the center plates of the truck. This produces a relatively noiseless car truck which is important since sounds generated in the car truck are transmitted directly through the body of the car to the interior thereof. Any other suitable resilient material the equivalent of rubber can, of course, be incorporated in the truck structure to prevent transmission of sounds into the car body.

Experience has shown that the arrangement of exhaust blowers and evaporation fans disclosed in this application is very effective for insuring comfortable conditions within a closed space, such as the body of a transportation vehicle. Thus, as shown in Figs. 11 and 12, the air which enters the vehicle is circulated over the passengers and then passes to the exhaust blowers and is discharged by them from the vehicle. This arrangement of the exhaust blowers and evaporation fans set up air circuits which are formed so as to blow the fresh air over the passengers, increasing evaporation on the skin of the passengers, producing a comfortable condition and supplying them with fresh air to breathe, after which the air flows to the exhaust blowers and is discharged from the vehicle. In Figs. 11 and 12 special air inlet ducts 200 are provided of any suitable construction to supplement the supply of air which enters the car around the doors and windows. As already stated, these special inlet ducts may be provided with suitable screens and electro-magnets to permit the entrance of air to the exclusion of dust, dirt, steel dust and noise.

As shown, for example, on a portion of the car in Fig. 12 the special air inlet ducts 200 may be provided with electro-magnetic steel dust collectors 400. Especially in the case of the operation of subway cars there is considerable steel dust in the air at all times produced by the wear of the car wheels on the rails and the brakes. Within the purpose of supplying only clean air to the interior of the car it is proposed to provide in the special air inlet ducts electro-magnetic steel dust collectors which may consist of iron cores having windings thereon as indicated diagrammatically in the drawings. These windings are connected by means of the wires 401 and 403 to a suitable current source 402 through a switch 440. These magnetic dust collectors may be of any suitable form for efficiently collecting steel dust from the air and may be of the form shown in the copending application of James S. Doyle, Serial No. 617,355 filed June 15, 1933. It is, of course, apparent that instead of using electro-magnetic apparatus permanent magnets could be employed so placed in the air stream as to collect the steel dust and particles therefrom.

From the above description it will be apparent that the principles of this invention and each of the apparatus disclosed may be equally well employed for securing the results of this invention in connection with all forms of buildings, and particularly those to be occupied by human beings. It is often desirable in buildings, such as office buildings, for example, to exclude the street noises therefrom and, of course, without interfering with the correct air conditions within them. Obviously, therefore, such buildings can be sealed and provided with the air supply apparatus and control therefor of this invention, with the result that the objects and advantages thereof may be readily secured.

It will be apparent that all of the features of this invention in combination cooperate to produce a transportation vehicle which is relatively quiet on the interior thereof, free from dust and dirt, comfortable and sanitary, and can be automatically provided with any degree of pure air. It is likewise apparent to those skilled in the art that these advantages may be obtained by other physical apparatus without departing from the principles of this invention and we do not, therefore, desire to be strictly limited to the disclosure, as given for purposes of illustration, but rather to the scope of the appended claims.

What we seek to secure by United States Letters Patent is:

1. A vehicle of the type described comprising a body having closed windows and doors, a plurality of exhaust blowers mounted within said body and arranged to discharge the air therein exteriorly of the body, and means for automatically opening the windows when the power supply to the blowers fails.

2. A vehicle of the type described comprising a substantially closed and sound-proof body having normally closed windows, electric motor driven blowers discharging exteriorly of the body for expelling the air therefrom, and electro-pneumatic means or automatically opening the windows when the electric power supply to the motor driven blowers fails.

3. A vehicle of the type described comprising a substantially closed car body having a plurality of windows therein, a plurality of normally closed ventilators in said body, power driven means for expelling the air from the body, fresh air leaking into the body around the windows, and means for automatically opening the windows and ventilators when the power driven means becomes inoperative.

4. A vehicle as described comprising a substantially closed body having normally closed windows, doors and roof ventilators, electric motor driven fans discharging exteriorly of the body for expelling the air therefrom, fresh air leaking into the car around the doors, windows and roof ventilators, means for normally holding the windows closed, means for normally holding the ventilators closed, and means controlled from the same power source which operates the fans for releasing the windows and ventilators when the power source fails.

5. A vehicle as described comprising a closed body having normally closed windows, doors and roof ventilators, means for releasably holding the windows and ventilators closed, power driven fans within said body for expelling the air therefrom, means for energizing the power driven fans, and means energized from the same source which energized the power driven fans for releasing the windows and ventilators so that they may open when the power source fails.

6. A vehicle as described comprising a closed body having normally closed windows, doors and roof ventilators, means for releasably holding the windows and ventilators closed, power driven fans within said body for expelling the air therefrom, means for energizing the power driven fans, means energized from the same source which energized the power driven fans for releasing the windows and ventilators so that they may open when the power source fails, and a time limit device for delaying for a predetermined period of time the release of the windows and ventilators.

7. A vehicle as described comprising a substantially closed body having normally closed windows and doors, a plurality of distributed electric motor driven blowers for expelling the air from the car body, circuits in said motors including an electro-pneumatic switch, means for energizing said circuits, said switch normally connecting a portion of the electric motor driven blowers in circuit, and a variable load device for controlling said electro-pneumatic switch for operating it to connect all of the electric motor driven blowers in circuit when the load in the car exceeds a predetermined weight.

8. In a vehicle of the type described comprising a substantially closed car body having normally closed windows and ventilators, means for holding the windows and ventilators closed, electric motor driven blowers for expelling the air from the car body, a current source for energizing the blower motors and electro-pneumatic means connected to the current source for maintaining the windows and ventilators closed when the blowers are operating, and automatically releasing the windows and ventilators when the blowers stop by failure of the current source.

9. In a vehicle of the type described comprising a substantially closed car body having normally closed windows and ventilators, means for holding the windows and ventilators closed, electric motor driven fans for expelling the air from the car body, a current source for energizing the fan motors and electro-pneumatic means connected to the current source for maintaining the windows and ventilators closed when the fans are operating, automatically releasing the windows and ventilators when the fans stop by failure of the current source, and means for delaying the release of the windows and ventilators for a predetermined period of time after the current source fails.

10. A vehicle of the type described comprising a substantially closed body having normally closed doors and windows, normally closed roof ventilators, motor driven fans for expelling the air from the car body, a power source for the fan motors, to which only a portion of the motors are normally connected, variable load control means operable by the load in the car body for connecting all of the fan motors in a circuit when the load in the car body exceeds a predetermined weight, and means for automatically causing the windows and ventilators to open when the power source fails.

11. In a transportation vehicle, a substantially closed body providing a space to be occupied by passengers, windows and doors for said body, a power driven exhaust blower for discharging air from said body, a power source for the blower, means for holding the windows normally shut, and means connected to the power source for releasing the windows when the power source fails.

12. In a transportation vehicle, a substantially closed body providing a space to be occupied by passengers, windows and doors for said body, a power driven exhaust blower for discharging air from said body, means for supplying fresh air to the interior of the body, a power source for the blower, means for holding the windows normally shut, and means connected to the power source for releasing the windows when the power source fails.

13. In a combination as described, a structure forming a substantially closed space, means for expelling air from said space, said space having openings, closure means for said openings, means for holding said closure means in normally closed position, a power source for said means for exhausting air from the space, and means controlled by the power source for releasing the closure means upon failure of the power source.

14. In a transportation vehicle, the combination comprising a substantially closed body having normally closed windows, means for holding the windows in closed position, means operating when energized to open the windows, a plurality of exhaust blowers for discharging the air from the body, a power source for said blowers, and means connected to said power source and operated when said source fails for energizing said means to open the windows.

15. In a transportation vehicle, the combination comprising a substantially closed body having normally closed windows, means for holding the windows in closed position, releasing means for said windows, a plurality of blowers for exhausting the air from said body, a power source for the blowers, and means for operating the releasing means when the blowers are stopped by a failure of the power source.

FRANK HEDLEY.
J. S. DOYLE.